(12) United States Patent
Saieg et al.

(10) Patent No.: US 10,870,347 B2
(45) Date of Patent: Dec. 22, 2020

(54) ELECTROMAGNETICALLY ACTUATED COUPLER

(71) Applicant: FORD GLOBAL TECHNOLOGIES, LLC, Dearborn, MI (US)

(72) Inventors: John R. Saieg, Wixom, MI (US); Jacob M. Povirk, Franklin, MI (US); Dennis W. Isken, II, Frankenmuth, MI (US); Brian J. Andonian, Plymouth, MI (US)

(73) Assignee: FORD GLOABL TECHNOLOGIES, LLC, Dearborn, MI (US)

( * ) Notice: Subject to any disclaimer, the term of this patent is extended or adjusted under 35 U.S.C. 154(b) by 1267 days.

(21) Appl. No.: 14/103,942

(22) Filed: Dec. 12, 2013

(65) Prior Publication Data
US 2015/0167751 A1 Jun. 18, 2015

(51) Int. Cl.
| F16D 11/14 | (2006.01) |
| B60K 23/08 | (2006.01) |
| F16D 27/108 | (2006.01) |
| F16D 27/118 | (2006.01) |
| B60K 17/35 | (2006.01) |

(52) U.S. Cl.
CPC ............. *B60K 23/08* (2013.01); *B60K 17/35* (2013.01); *F16D 11/14* (2013.01); *F16D 27/108* (2013.01); *F16D 27/118* (2013.01); *B60K 2023/0858* (2013.01)

(58) Field of Classification Search
CPC ............................ F16D 27/09; B60K 17/3515
USPC ...................................................... 192/69.42
See application file for complete search history.

(56) References Cited

U.S. PATENT DOCUMENTS

| 4,534,455 | A | * | 8/1985 | Fujikawa | .................... 192/69.42 |
| 4,694,943 | A | * | 9/1987 | Petrak | ................ B60K 17/3515 |
| | | | | | 192/35 |
| 4,899,856 | A | * | 2/1990 | Kurihara | ............ B60K 17/3515 |
| | | | | | 192/69.42 |
| 5,038,884 | A | | 8/1991 | Hamada et al. | |
| 5,967,279 | A | * | 10/1999 | Itoh et al. | .................. 192/69.41 |
| 6,409,000 | B1 | * | 6/2002 | Itoh et al. | ........................ 192/39 |
| 8,042,642 | B2 | | 10/2011 | Marsh et al. | |
| 8,132,638 | B2 | | 3/2012 | Marius et al. | |
| 2008/0230295 | A1 | * | 9/2008 | Grogg | ........................... 180/248 |

(Continued)

FOREIGN PATENT DOCUMENTS

| FR | 2621964 A1 | 4/1989 | |
| JP | WO 2013115319 A1 | * 8/2013 | ......... B60B 27/0026 |

OTHER PUBLICATIONS

Wikipedia snapshot of "Definition of Circlip", taken Jun. 17, 2015.*

(Continued)

*Primary Examiner* — Stacey A Fluhart
(74) *Attorney, Agent, or Firm* — MacMillan, Sobanski & Todd, LLC; Vincent Mastrogiacomo

(57) ABSTRACT

A wheel end assembly includes a first shaft supported on a knuckle secured to a vehicle frame, including first clutch teeth, a second shaft secured to the halfshaft, a coil, and a collar rotatably secured to the second shaft, axially displaceable relative to the first shaft, including second clutch teeth that alternately engage the first clutch teeth due to an electromagnetic field produced by energizing the coil and disengage from the first clutch teeth.

18 Claims, 4 Drawing Sheets

(56) References Cited

U.S. PATENT DOCUMENTS

2012/0088623 A1* 4/2012 Nagumo et al. .............. 475/149
2014/0339885 A1* 11/2014 Umekida ................. C21D 9/32
                                                                                                                  301/6.5

OTHER PUBLICATIONS

Definition of Outboard, retrieved from www.merriamwebster.com on Jan. 12, 2017.*
Definition of Inboard, retrieved from www.merriamwebster.com on Jan. 12, 2017.*
"Inboard vs Outboard" taken from http://www.seabornboats.com/inboard-vs-outboard-motor-talk/ on Aug. 22, 2017.*

* cited by examiner

ELECTROMAGNETICALLY ACTUATED COUPLER

BACKGROUND OF INVENTION

This invention relates generally to a driven axle of a motor vehicle and more particularly to an electrically actuated clutch or coupler for disconnecting a drive connection to the wheels when torque is not needed at the axle.

Halfshafts that extend laterally from rear axle drive units (RDU's) of front engine transversely-mounted all wheel drive (AWD) vehicles, continuously rotate with the rear wheels even when torque is not being transmitted to the RDU.

This continuous rotation of the halfshafts produces energy losses associated with the rotating mass of the halfshafts and other RDU components including parasitic pumping losses from the internal components of the RDU.

A need exists in the industry to disconnect the rear wheels from the RDU when torque is not needed at the rear axle whereby improved fuel economy of the vehicle can be realized.

SUMMARY OF INVENTION

A wheel end assembly includes a first shaft supported on a knuckle secured to a vehicle frame, including first clutch teeth, a second shaft secured to the halfshaft, a coil, and a collar rotatably secured to the second shaft, axially displaceable relative to the first shaft, including second clutch teeth that alternately engage the first clutch teeth due to an electromagnetic field produced by energizing the coil and disengage from the first clutch teeth.

Dog clutch requires only 1 to 2 mm of axial engagement, reducing stroke of locking mechanism and allowing quicker engagement compared to spline coupling devices.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1:
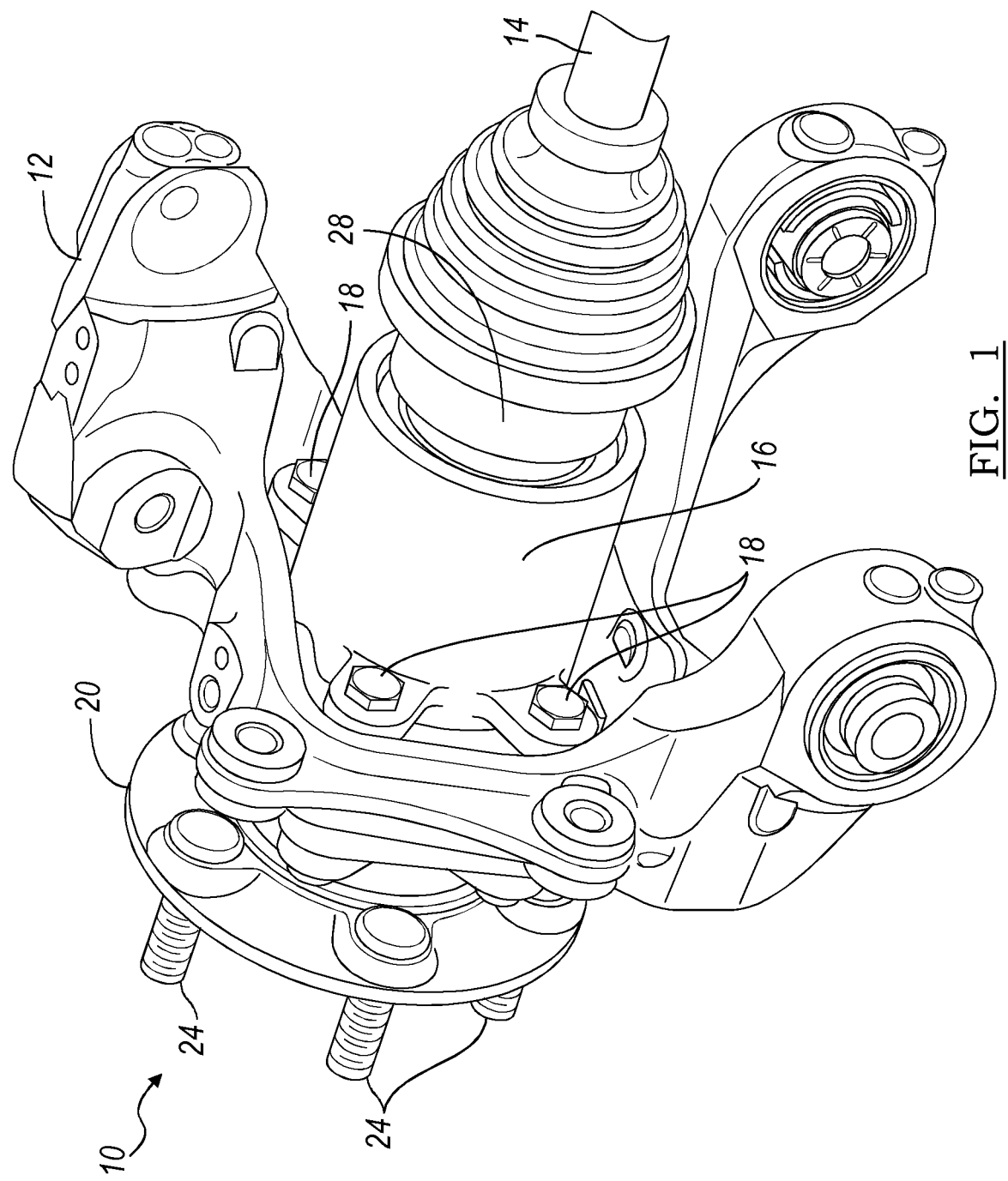
FIG. 1 is a perspective view showing a left-hand side wheel end having an electric disconnect.
Figure 2:
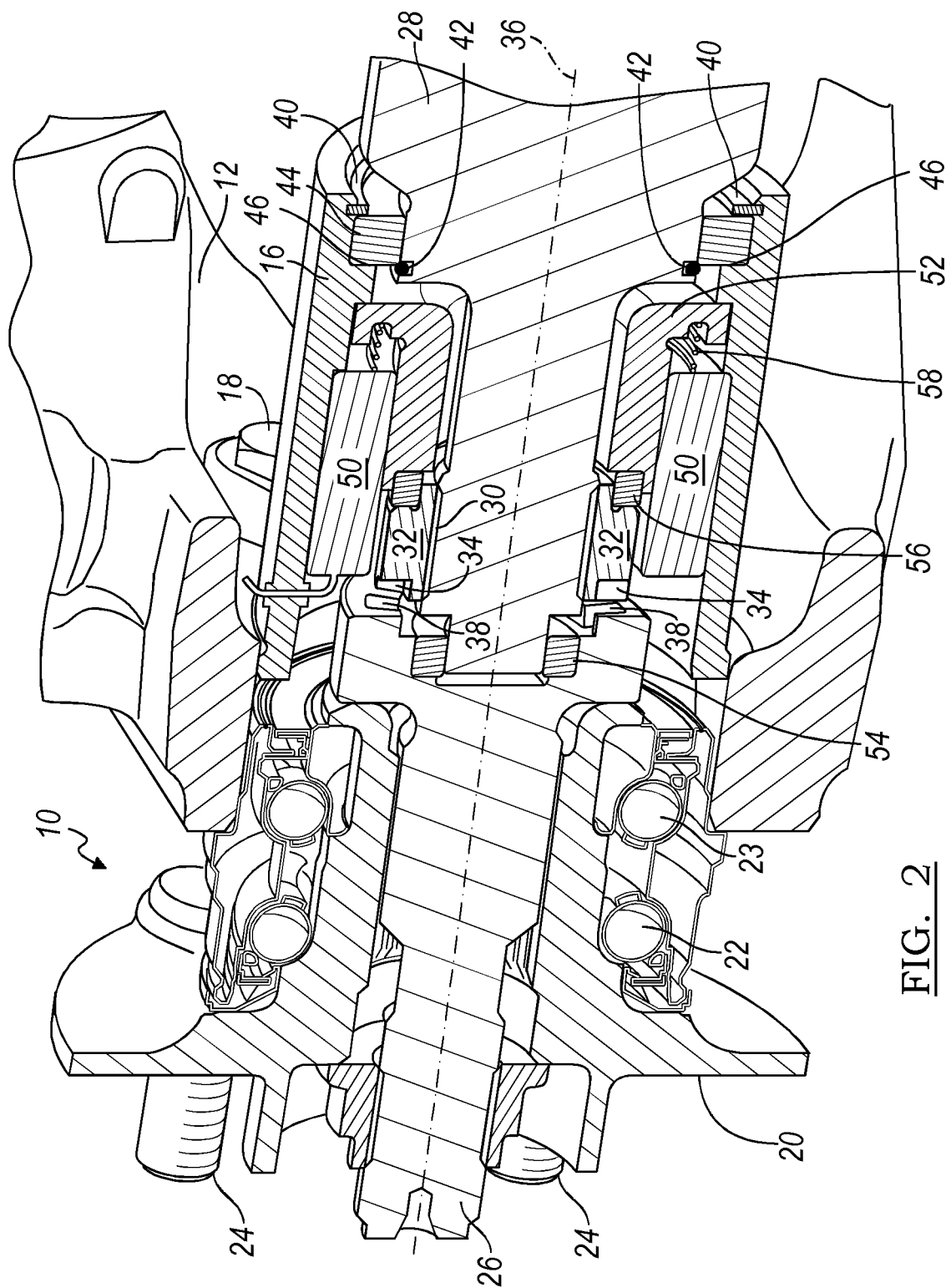
FIG. 2 is a perspective longitudinal cross section of the wheel end of FIG. 1 taken through a diametric plane showing the wheel end disconnected from the halfshaft.
Figure 3:
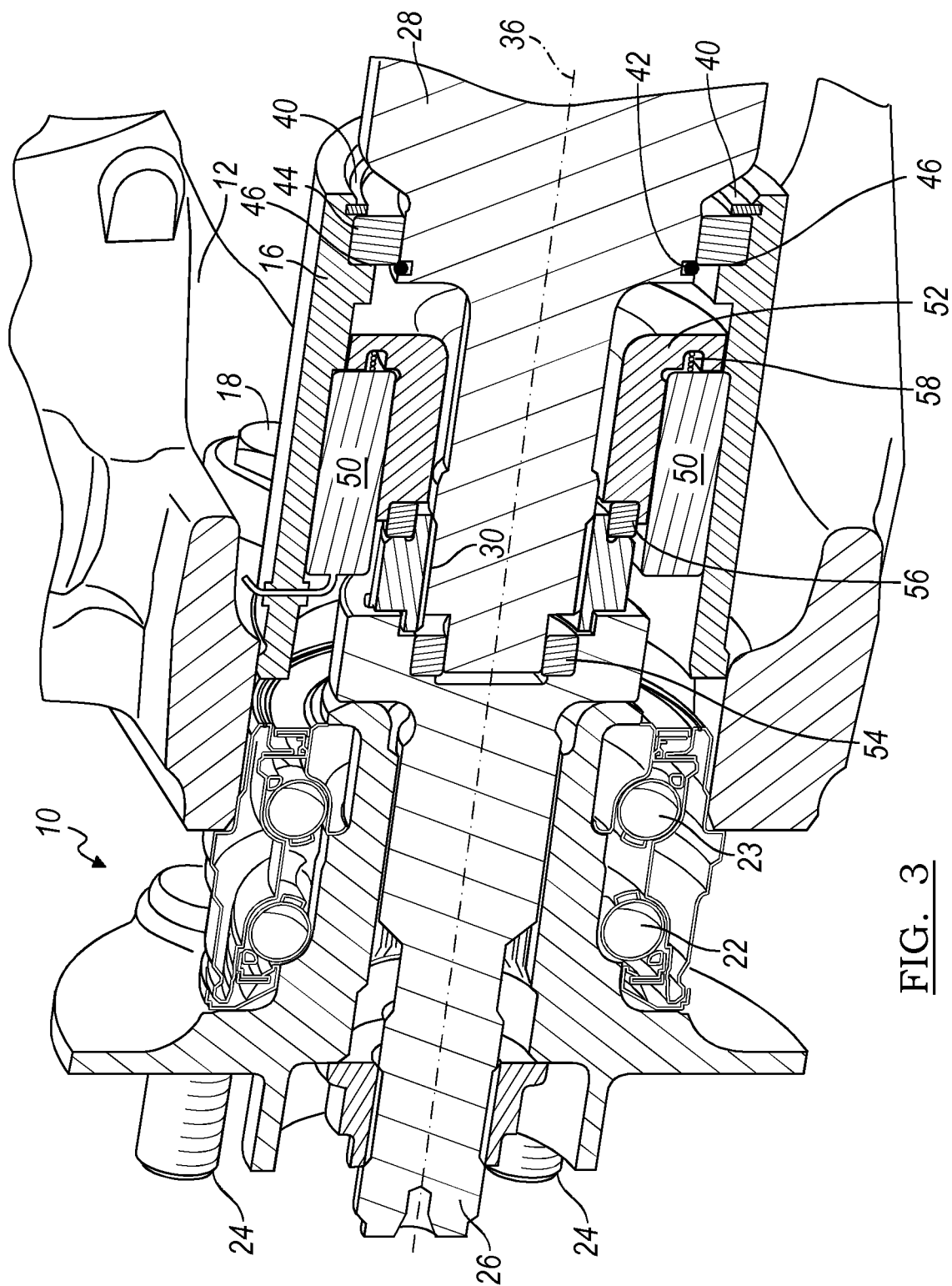
FIG. 3 is a perspective longitudinal cross section of the wheel end of FIG. 1 taken through a diametric plane showing the wheel end driveably connected to the halfshaft.

FIGS. 1 and 2 show a wheel end assembly 10 including a wheel end knuckle 12, which is secured to a vehicle frame; a halfshaft 14, which extends outboard and leftward for a RDU and its differential mechanism; an inner hub housing 16, which is secured by bolts 18 to knuckle 12; and a wheel hub 20, which is supported by wheel bearings 22, 23 on knuckle 12 and carries lug bolts 24. Although components for the left hand side of the vehicle are shown, there is a disconnect at both the left and right wheel ends, with the right hand side being symmetrical with the left hand side.

As FIG. 2 shows, the wheel end axle shaft comprises an outboard shaft 26, rotationally fixed to the wheel hub 20, and an inboard shaft 28, secured to halfshaft 14 and free to rotate within the inner hub housing 16. The inboard shaft 28 has provisions for a CV joint on the inboard side of the shaft and is formed with external, axial spline teeth 30.

A sliding collar 32 is secured to the inboard shaft 28 by internal, axial spline teeth, which engage the external spline teeth 30, such that collar 32 and inboard shaft 28 rotate together as a unit, but the collar can move axially relative to the inboard shaft. Collar 32 is formed with radially extending dog teeth 34, angularly spaced about axis 36 and located at the outboard end of the collar. The inboard end of the outboard shaft 26 is formed with radially extending dog teeth 38 angularly spaced mutually about axis 36, which alternately engage and disengage dog teeth 34.

The inboard shaft 28 is axially retained within the wheel hub housing 16 by a snap ring 40 and circlip 42, which are located on axially opposite sides of a sealed ball bearing 44. Snap ring 40 prevents the ball bearing 44 from moving inboard. A step 46 machined on the inner hub housing 16 prevents ball bearing 44 from moving outboard. The inboard shaft 28 has a halfshaft circlip groove machined on its outer surface outboard of ball bearing 44. The circlip 42, once installed in the groove, prevents the inboard shaft 28 from moving inboard.

An electromagnetic coil 50 of electrically conductive wire is held against rotation by being secured to the inside wall of the inner hub housing 16. When the coil 50 is energized with electric current, an electromagnetic field produced by the coil moves a plunger 52 outboard along axis 36 causing dog teeth 34 of collar 32 to engage dog teeth 38 of the outboard shaft 26, thereby driveably connecting halfshaft 14 and outboard shaft 26. When the dog clutch teeth 34, 38 are mutually engaged, the outboard shaft 26 and inboard shaft 28 are rotatably engaged.

Bearing 54, 44 and bearings 22, 23, located within the wheel end 10, allow shafts 26, 28 to rotate mutually concentrically and concentrically to the inner hub housing 16.

A return spring 58 is placed to return the plunger 52 and sliding collar 32 to the disengaged position when the coil 50 is de-energized.

Figure 4:
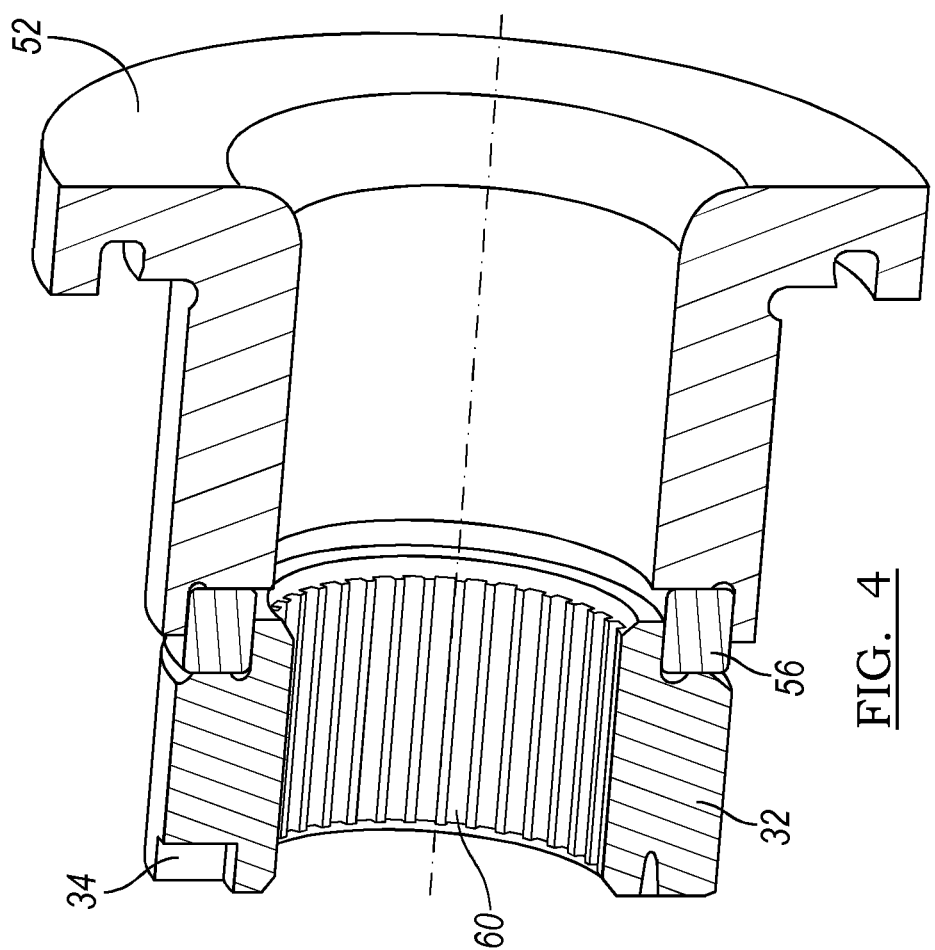
FIG. 4 is a perspective longitudinal cross section of the plunger assembly 1 taken through a diametric plane.

FIG. 4 shows the plunger 52, collar 32 and intermediate bearing 56, which permits the collar to rotate freely relative to the plunger and transmits axial force from the plunger to the collar when the coil 50 is energized. The inner surface 60 of collar 32 is formed with internal, axial spline teeth which are continually engaged with the external, axial spline teeth 30 on the inboard shaft 28.

In accordance with the provisions of the patent statutes, the preferred embodiment has been described. However, it should be noted that the alternate embodiments can be practiced otherwise than as specifically illustrated and described.

The invention claimed is:

1. A wheel end assembly, comprising:
    an outboard shaft supported on a knuckle secured to a vehicle frame, including first clutch teeth;
    an inboard shaft;
    a coil;

a plunger;
a spring biasing the plunger axially away from the outboard shaft;
a collar rotatably secured to the inboard shaft, axially displaceable relative to the outboard shaft, including second clutch teeth;
a thrust bearing located axially between the plunger and the collar that transmits axial movement of the plunger to the collar when the coil is energized to engage the first and second clutch teeth.

2. The wheel end assembly of claim 1, further comprising:
a wheel hub supported by bearings on the knuckle and splined for rotation on the outboard shaft.

3. The wheel end assembly of claim 1, wherein:
the inboard shaft includes first axial spline teeth integral with the inboard shaft;
the collar includes second axial spline teeth continually engaged with the first axial spline teeth;
the first clutch teeth are located on an inboard axial end face of the outboard shaft; and
the second clutch teeth are located on an outboard axial end face of the collar.

4. The wheel end assembly of claim 1, further comprising:
an inner hub housing rotationally fixed to the knuckle and containing within the housing the coil, the collar, the plunger, the thrust bearing and the spring.

5. The wheel end assembly of claim 4, further comprising:
a second bearing mounted within the inner hub housing for supporting the inboard shaft on the inner hub housing; and
a third bearing for supporting an outboard end of the inboard shaft on an inboard end of the outboard shaft.

6. The wheel end assembly of claim 5, further comprising:
a snap ring secured to the inner hub housing and contacting an inboard axial side of the second bearing;
a circlip secured to the inboard shaft and contacting the second bearing at an outboard axial side of the second bearing.

7. A wheel end assembly, comprising:
an outboard shaft, secured to a wheel hub, including an inboard end face having radially extending first dog teeth;
an inboard shaft;
a coil;
a collar, rotatably secured to the inboard shaft and axially displaceable relative to the outboard shaft, including an outboard end face having radially extending second dog teeth that engage the first dog teeth due to energizing the coil.

8. The wheel end assembly of claim 7, wherein:
the wheel hub is supported by bearings on a knuckle, and is splined for rotation on the outboard shaft.

9. The wheel end assembly of claim 7, wherein:
the inboard shaft includes first axial spline teeth integral with the inboard shaft; and
the collar includes second axial spline teeth continually engaged with the first axial spline teeth.

10. The wheel end assembly of claim 7, further comprising:
an inner hub housing rotationally fixed to a knuckle and containing within the housing the coil, the collar, a plunger, a thrust bearing located axially between the plunger and the collar for transmitting axial movement of the plunger to the collar when the coil is energized, and a spring for returning the plunger to a disengaged position.

11. The wheel end assembly of claim 10, further comprising:
a second bearing mounted within the inner hub housing for supporting the inboard shaft on the inner hub housing; and
a third bearing for supporting an outboard end of the inboard shaft on an inboard end of the outboard shaft.

12. The wheel end assembly of claim 11, further comprising:
a snap ring secured to the inner hub housing and contacting an inboard axial side of the second bearing;
a circlip secured to the inboard shaft and contacting the second bearing at an outboard axial side of the second bearing.

13. A wheel end assembly, comprising:
an outboard shaft for transmitting torque to a wheel hub, including radially extending first dog teeth;
an inboard shaft;
a coil radially outboard of and axially spaced from the outboard shaft;
a collar, rotatably secured to the inboard shaft and axially displaceable relative to the outboard shaft, including an outboard end face having radially extending second dog teeth that engage the first dog teeth due to energizing the coil.

14. The wheel end assembly of claim 13, further comprising:
the wheel hub supported by bearings on a knuckle and splined for rotation on the outboard shaft.

15. The wheel end assembly of claim 13, wherein:
the inboard shaft includes first axial spline teeth;
the collar includes second axial spline teeth continually engaged with said first axial spline teeth;
the first dog teeth are located on an axially inboard end face of the outboard shaft; and
the second dog teeth are located on an axially outboard end face of the collar.

16. The wheel end assembly of claim 13, further comprising:
an inner hub housing rotationally fixed to a knuckle and containing within the housing the coil, the collar, a plunger, a thrust bearing located axially between the plunger and the collar for transmitting axial movement of the plunger to the collar when the coil is energized, and a spring for returning the plunger to a disengaged position.

17. The wheel end assembly of claim 16, further comprising:
a second bearing mounted within the inner hub housing for supporting the inboard shaft on the inner hub housing; and
a third bearing for supporting an outboard end of the inboard shaft on an inboard end of the outboard shaft.

18. The wheel end assembly of claim 17, further comprising:
a snap ring secured to the inner hub housing and contacting an inboard axial side of the second bearing;
a circlip secured to the inboard shaft and contacting the second bearing at an outboard axial side of the second bearing.

* * * * *